(12) United States Patent
Hennessey

(10) Patent No.: US 6,452,891 B1
(45) Date of Patent: Sep. 17, 2002

(54) METHOD FOR INITIALIZING A DATA STORAGE DEVICE

(75) Inventor: Michael E. Hennessey, South Lyon, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/492,047

(22) Filed: Jan. 26, 2000

(51) Int. Cl.[7] .............................. G11B 7/24; G11B 7/125
(52) U.S. Cl. ........................ 369/116; 369/100; 369/122; 430/270.13; 264/1.33
(58) Field of Search .................. 369/121, 122, 369/116, 100; 430/270.13; 264/1.33

(56) References Cited

U.S. PATENT DOCUMENTS

| | | | | |
|---|---|---|---|---|
| 3,654,864 A | * | 4/1972 | Ovshinsky | 340/173 |
| 5,604,003 A | * | 2/1997 | Coombs et al. | 428/64.1 |
| 5,626,670 A | * | 5/1997 | Varshney et al. | 117/7 |
| 5,684,778 A | * | 11/1997 | Yamada et al. | 369/100 |
| 5,768,221 A | * | 6/1998 | Kasami et al. | 369/14 |
| 5,876,822 A | * | 3/1999 | Zhou et al. | 428/64.1 |
| 6,210,770 B1 | * | 4/2001 | Kikuchi et al. | 428/64.1 |
| 6,256,286 B1 | * | 7/2001 | Ogawa | 369/116 |

* cited by examiner

Primary Examiner—W. R. Young
Assistant Examiner—Gautam R. Patel
(74) Attorney, Agent, or Firm—Dean B. Watson; Marvin S. Siskind

(57) ABSTRACT

A method for initializing a phase change information storage device. The method includes the steps of: providing a data storage device having a phase change data storage medium, and exposing the phase change data storage medium with a first, energy exposure for about 1 μsec or less. The first exposure is then followed by at least one additional energy exposure to complete initialization

33 Claims, 2 Drawing Sheets

METHOD FOR INITIALIZING A DATA STORAGE DEVICE

BACKGROUND OF THE INVENTION

1. Field of the Invention

The present invention pertains to data storage devices where data is stored in a material that is reversibly convertible between detectable states in response to the input of energy. More particularly, the present invention pertains to a method for initializing a data storage device having a phase change data storage medium that is convertible between detectable states.

2. Description of the Background Art

Writable data storage or memory devices have been fundamental in furthering the technology driven information age. Included in writable data storage devices are the now highly commercialized and widely distributed phase change data storage medium.

An enormous consumer demand for writable and rewritable memory storage devices presently exists. Mass production of writable and rewritable memory storage devices in the form of phase change information data storage devices is currently underway to meet this consumer demand. For example, one well-known data storage device is the phase change optical memory disk. The typical optical memory disk may have a variety of layers to effect data storage, including a protective layer, a reflective layer, an upper dielectric layer, a phase change medium, a lower dielectric layer, and a disk substrate. The layers of the optical memory disk may also be formed in other configurations as well.

The phase change optical disk is a device with multiple detectable states that allow for the storage of data. For example, a phase change optical data storage device may have a chalcogenide memory material used as the active memory layer. The chalcogenide memory material may have an amorphous state, a crystalline state and varying intermediate states. When the phase change material is deposited on a disk, the material is formed in an essentially amorphous state. The crystallization characteristics of the material are different in first crystallization from all subsequent crystallizations. Therefore, the disk must be crystallized once before the disk is ready for use. This first crystallization is referred to as initialization. Thus, preparation of a newly manufactured phase change data storage device requires that the device be initialized into a crystalline state so that data can be reliably written and erased.

Present day disk initialization is typically carried out by directing a continuous laser beam along a track of an optical disk as the disk rotates. The laser energy is utilized to change the recording medium from an amorphous state to a crystalline state. An example of this process has been described in U.S. Pat. No. 5,768,221 which issued to Kasami et al. Therein is disclosed a method for initializing an optical recording medium by rotating a disk at a speed of 1000 rpm and directing a laser beam upon a small portion of the recording medium. The laser beam then moves from the inner most to the outermost circumference sections of the disk. Therefore, as the method serially initializes the disk, the method is relatively slow and does not lend itself to efficient mass production.

One attempt made at initializing the entire optical disk with a single energy exposure has been described in U.S. Pat. No. 5,684,778, which issued to Yamada et al. on Nov. 4, 1997. The Yamada patent discloses a process for initializing a phase change recording medium using flash light emission which drops the emission strength instantly to a zero level immediately after crystallization. The method teaches the necessity of exposing the disk to a single flash or single discharge of high intensity light for 0.1 to 10 msec with no residual exposure. The waveform described in the Yamada patent claims to fully and completely crystallize the phase change recording medium with the single energy exposure. Yet, as the patent admits, problems invariably arise in alleviating internal stresses and the tendency to cause warp and distortion in the disk, which problems the patent does not solve. Warp and distortion in the recording medium may provide a major cause of malfunction in disks and are therefore undesirable. To compensate for the warp created by the initialization method disclosed in the Yamada patent, said method requires a further step of unwarping or straightening an otherwise unusable disk. Additionally, internal stress can cause cracking and/or delamination of various layers within the optical disk. As such, methods of flash initialization, as presently known, are not desirable for large-scale commercial purposes.

Thus, present day methods for initializing phase change memory devices result in a reduction of production cycle time and increased manufacturing costs.

SUMMARY OF THE INVENTION

To address the above mentioned problems and others, the present invention provides a method for initializing a phase change information storage device including the steps of: providing a data storage device having a phase change data storage medium; exposing substantially all the phase change data storage medium with a first, energy exposure for about 1 $\mu$sec or less. The first exposure is then followed by at least one additional energy exposure to complete initialization in a short period of time with reduced device damage and warp.

The initialization process may be accomplished by variations upon the present method, as will become evident from the ensuing disclosure, all of which are desired to be protected by the claimed invention, but in any event will require exposing the data storage medium to a first or pre-initialization energy. The pre-initialization energy is preferably delivered to the data storage medium as a predetermined waveform over a predetermined time with a power and spectral content suitable for initializing a memory device with reduced damage. Such a waveform preferably includes an initial pulse or burst of energy having a rise in intensity, a maximum intensity, and a decline in intensity over a period or duration of 1 $\mu$sec or less. The waveform, energy level and spectral content act to pre-initialize the data storage medium. The initial pulse of energy is then followed by one or more additional exposures of energy, which complete the initialization process with reduced warp and device damage.

The method for initializing a memory device in accordance herewith is especially useful for initializing phase change optical disks, such as CD-RW, PD, DVD-RAM, DVD-RW, DVD+RW, multi-level optical disks, multi-layer optical disks, as well as others.

For a more complete understanding of the present invention, reference is made to the following detailed description and accompanying drawings.

DETAILED DESCRIPTION OF THE PREFERRED EMBODIMENTS

While the present invention disclosed herein is described with respect to optical disk type systems, the present invention is not limited to such systems, rather, it also finds application in any system that must be initialized and where energy is applied to change the state of the material in a predictable manner. For example, the initialization method of the present invention may be utilized for all types of memory systems that require energy to render detectable states, such as optical memory disks, multi-layer disks, multi-level recording disks, electrical phase change memory, etc.

Figure 1:
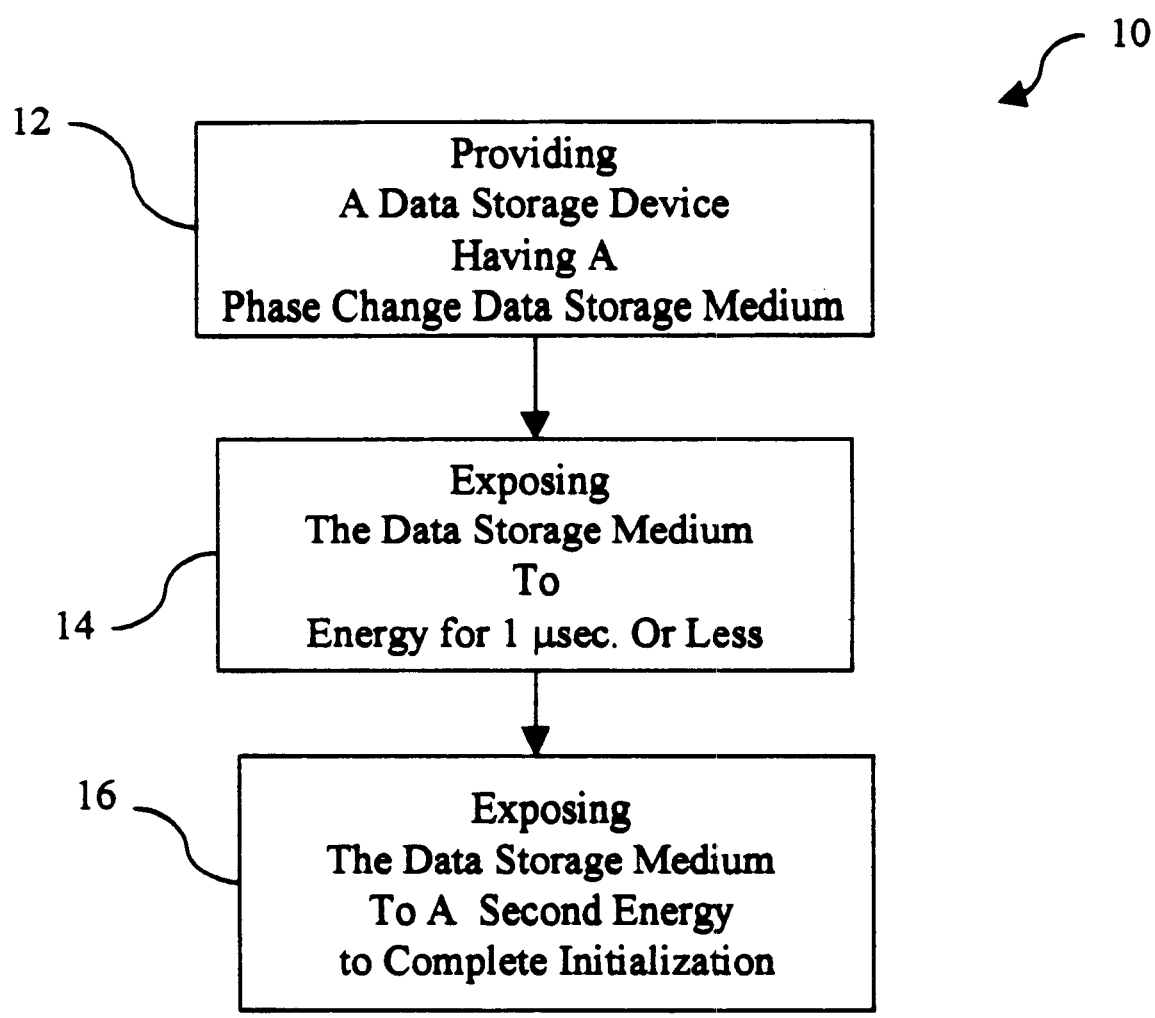
FIG. 1 is a flow diagram of a method for initializing an information storage device in accordance with the present invention.

Now with more particularity, and with reference to FIG. 1, therein is generally depicted at 10 a flow diagram of a method for initializing a phase change data storage device in accordance with the present invention. The method for initializing 10 a phase change data storage device includes the steps of: providing 12 a data storage device having a phase change data storage medium and exposing the phase change data storage medium with a plurality of energy exposures. In a preferred aspect hereof, the step of exposing with a plurality of energy exposures comprises exposing 14 the data storage medium to a first energy pulse having a duration of about 1 $\mu$s or less and exposing 16 the data storage medium to a second energy. Following the first exposure of energy, the data storage medium may be allowed to cool. Pre-initializing a data storage device with a first energy pulse having a duration of about 1 $\mu$sec or less provides initialization with reduced data storage device cracking and delamination.

Figure 2:
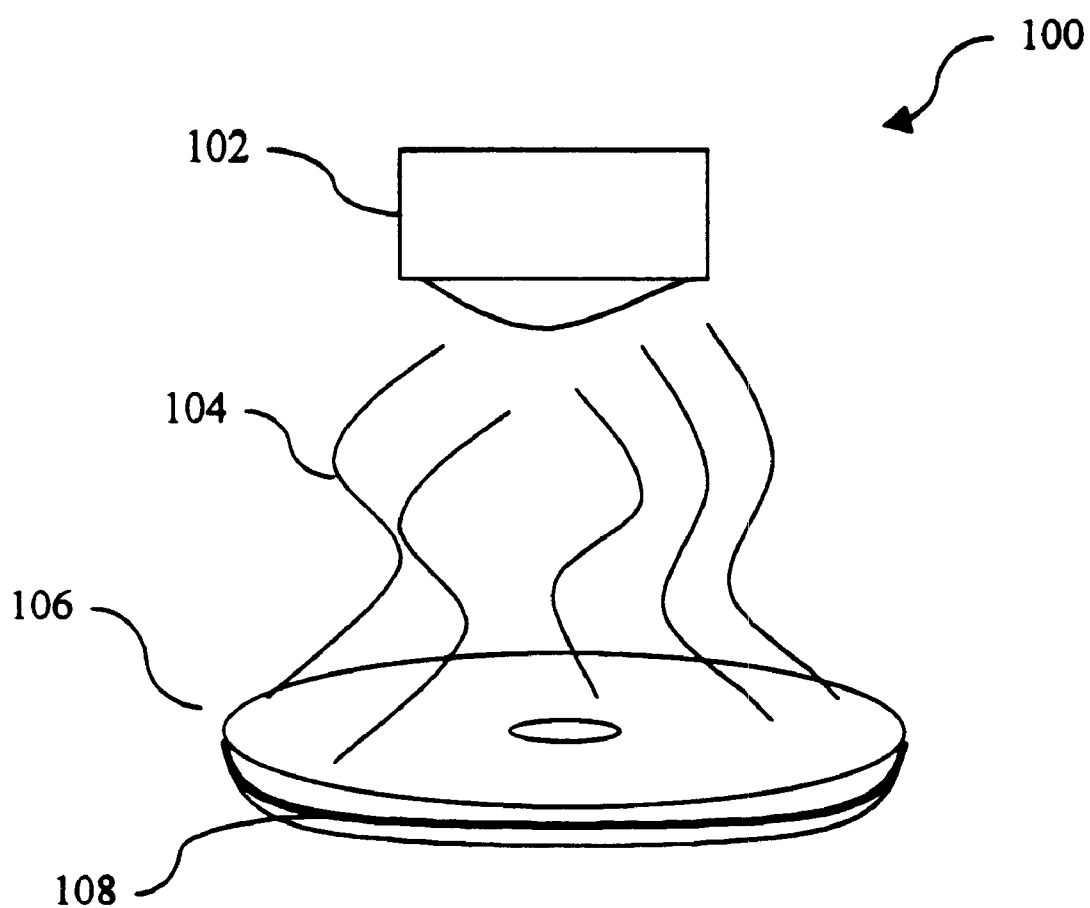
FIG. 2 is a perspective view of a system for initializing an information storage medium in accordance with the present invention.

Referring now to FIG. 2., generally depicted therein at 100 is a system 102 for initializing a data storage device 106. The data storage device 106 may be any type of apparatus capable of storing data in a medium, which is convertible with energy to more than one detectable state. The data storage device 106 may not be limited to any particular form of memory device but may be applicable to all forms of memory utilizing a phase change data storage material or active memory medium including, for example, optical memory, electrical memory, etc.

In a preferred aspect hereof, the data storage device 106 is an optical data storage device having a phase change data storage medium 108. The data storage medium 108 may be disposed in or upon any useable substrate and provided in any useable form including such forms as, disks, cards, sheets, films, chips, etc. A preferred form is an optical phase change disk.

The optical phase change disk may be of the type having a series of layers, including for example, protective layers, a reflective layer, an upper dielectric, an active layer or phase change layer, a lower dielectric, and a disk substrate. The optical phase change disk may also be layered or configured in many ways with layers acting to control reflectivity, heating and cooling, and heat distribution which are generally known in the art of phase change data storage devices.

As briefly mentioned above, the data storage device has a phase change data storage medium. The phase change data storage medium may be comprised of any reversibly changeable material capable of changing states according to an input of energy, such as a chalcogenide material. The phase change data storage medium may be provided in any suitable form, including a discrete, single layer of phase change material, optically tuned multiple layers, or any other form suitable for storing data. The phase change data storage medium is preferably a thin film including at least one element or a combinations of elements selected from the group consisting of Te, Ge, Sb, Se, In, or Ag. A preferred phase change data storage medium comprises a chalcogenide having Te or Sb as a main component. For examples of phase change data storage mediums applicable to the present invention, see U.S. Pat. No. 5,912,104 issued Jun. 15, 1999 to Hirotsune et al., the disclosure of which is herein incorporated by reference. Additionally, see U.S. Pat. Nos. 4,653,024; 4,820,394; 4,737,934; 4,710,899; 5,912,104; 5,128,099; and 5,935,672 for other examples of phase change data storage mediums applicable to the present invention, the disclosures of which are herein incorporated by reference.

The data storage material may be disposed upon a substrate by any suitable method, many of which are conventional. Conventional methods of disposing the data storage material upon a substrate include sputtering, evaporation deposition, plasma enhanced chemical vapor deposition or other techniques.

When a data storage device is initially manufactured, the data storage medium is typically provided in an unitialized state. An uninitialized state is defined as a condition of the data storage medium unsuitable for writing, storing or recording data. The unitialized state may arise from an insufficiently crystallized state that lacks nucleation. For example, a conventional optical phase change disk of the chalcogenide type typically has a crystalline state and an amorphous state. Data may be recorded or stored to the phase change medium by changing the crystalline state to the amorphous state and vise versa. The data storage material is typically deposited in an amorphous state during manufacture of a new phase change data storage device. Depositing the data storage material in an amorphous state causes the newly manufactured device to be unusable. Thus, to make the device usable, the device must be initialized.

Initialization prepares a 'blank' data storage device for storing information in a retrievable state. Initialization may be preformed before the first use a data storage device or may also be preformed to erase an already written to medium. As briefly described above, initialization includes exposing the phase change data storage medium to a first or pre-initialization energy. The pre-initialization energy may be any suitable form of high intensity energy exposure. The pre-initialization energy may be radiant, inductive, convection, or conductive energy. Radiant energy, as referred to throughout this disclosure, refers to any type of electromagnetic energy, which may be delivered to the data storage medium in pulses, particles or waves, such as heat, light, x-rays, gamma rays, microwaves, etc. The pre-initialization energy is preferably radiant energy that has a greater absorbency in the memory medium than in the surrounding substrate. The surrounding substrate includes the disk substrate and any other layers present except for the phase change medium. The energy is preferably absorbed at a ratio of surrounding substrate absorption to memory medium absorption of at least 1 to 5, respectively, and more preferably absorbed at a ration of at least 1 to 10, respectively, and most preferably at least 1 to 20 respectively. Selective energy absorption is material dependent and will vary depending upon the phase change material and supporting substrate used. For example, the pre-initialization energy is preferably provided as light having a wavelength between $3 \times 10^{-6}$ m and $3 \times 10^{-9}$ m, the particular wavelength selected to have a higher absorption in the phase change material than in the substrate. The pre-initialization energy may be provided as broad band energy, discrete bands of energy, or discrete wavelengths of light, such as red light, green light or blue light. Suitable bands of wavelengths may be selected from such bands as 300 nm to 800 nm or 460 nm to 500 nm or may include only a single, discrete wavelength, like 488 nm. Wavelengths suitable to achieve the absorption ratio in accordance with the present invention can be determined by a number of methods, including testing the substrate and the memory material independently for energy absorption.

The pre-initialization energy exposes at least a portion of the phase change medium and takes place over a short time period. The phase change medium extends about a plane over an area and to a depth. The pre-initialization energy is preferably delivered to the phase change medium over an area or a cross-sectional area of 1 cm$^2$ or greater and more preferably delivered simultaneously to an area encompassing the entire phase change material. The preinitialization energy may also be simultaneously delivered to the entire volume of the phase change medium. The exposure period is preferably about 1 μsec or less and more preferably about 200 nanoseconds or less. A pre-initialization energy having an exposure interval of 1 μsec or less enables incremental initialization with reduced disk damage.

The pre-initialization energy may be provided by any apparatus capable of delivering an energy pulse having a spectral content, shape, width, peak power, and rise/fall time that will allow a data storage device to be pre-initialized and then incrementally initialized without significant damage or full initialization with any single exposure. The energy source is preferably adapted to deliver a discrete, non-continuous exposure of energy to the entire area or cross-sectional area of the phase change data storage medium simultaneously. The discrete exposure of energy may be provided by a number of devices including a pulsed laser or flash lamp. The waveform of the discrete burst of energy provided by the energy source is such that initialization, i.e. crystallization as the case may be, is not fully completed after a single exposure.

To complete initialization the pre-initialization energy is followed by at least one additional energy exposure or a second energy. The second energy is preferably delivered to at least a portion of the phase change material. The phase change medium extends about a plane over an area and to a depth. The energy is preferably delivered to the phase change medium over an area or cross-sectional area of 1 cm$^2$ or greater and more preferably delivered about the entire area or cross-sectional area of the phase change medium simultaneously. The second energy may also be delivered to the entire volume of the phase change medium simultaneously. The second energy may be a single short pulse, a single long and continuous exposure, a series of short pulses, any combination of the preceding, etc. The second energy is preferably delivered as a series of discrete, discontinuous or substantially discontinuous low duty factor pulses having a duration and repetition rate such that the film temperature falls below the crystallization temperature between pulses. Energy pulses delivered as a series of low duty factor, relatively low energy pulses provide a temperature profile in the recording film suitable to optimize crystallization or crystal growth with reduced initialization damage.

If a plurality of energy pulses, such as low duty factor pulses, are used as the second energy, the second energy may further include a final pulse of high energy. The final pulse of energy has a power and duration sufficient to fully saturate the recording medium in the initialized state. The final pulse thereby ensures complete initialization or crystallization after the data storage medium has been substantially initialized.

The second energy may be any suitable and useful form of energy including, radiant, convectional, induction, or conduction energy. The energy may be provided by any suitable energy generating apparatus including lasers, lamps, coils, bulbs, ovens, heating coils, flash lamps, etc. The second energy is preferably radiant energy in the form of electromagnetic energy. More preferably, the energy is in the form of visible light. Most preferably, the energy is in the form of red, green or blue light. For example, the energy may be provided by a laser suitable for irradiating the entire data storage medium or a flash lamp.

The first or pre-initialization energy may or may not be the same form of energy as the second energy. For example, the pre-initialization energy may be provided as visible light and the second energy may be provided in the form of thermal energy. Energy provided in alternate forms can allow for added control of the initialization process and improved manufacturing speed with reduced data storage device damage.

Each energy exposure may comprise a profile of one or more wavelengths to enhance initialization while reducing collateral stress and thermal distortion of a disk structure. The profile may be a single wavelength, multiple discrete wavelengths, or broadband. For example, when light is used to initialize a phase change optical disk, the light may be a single wavelength, such as 488 nm, a plurality of discrete wavelengths, such as 350, 488 nm and 800 nm or broadband energy which includes a continuous range or a plurality of continuous ranges of wavelengths, such as 400 nm through 800 nm. The selection of energy profile and wavelength is preferably based upon the data storage medium to be initialized and the surrounding substrate. Selected wavelengths improve initialization through photonic effects that reduce the necessary thermal energy input required for initialization, thereby reducing thermal damage to the supporting disk substrate, and reducing thermal stresses within the coating stack.

A cooling period is provided between the first and second energy exposures. The cooling period acts to interrupt the progression of crystallization or reduce the rate of crystallization. Cooling may also be provided between individual second energy pulses, which may also be necessary to slow the initialization process and control thermal input in order to reduce disk damage. To accomplish this the phase change medium is preferably cooled below the nucleation temperature of the phase change medium between energy pulses. Cooling may be passively or actively induced, such as by thermal diffusion and/or radiation, a heat sink in thermal communication with the phase change data storage medium or with a directed flow of a gas or a fluid.

Although not desiring to be bound by theory, it is believed that a single, short duration, high energy, pre-initialization pulse works to nucleate the phase change medium without significant crystal growth taking place. Following the pre-initialization pulse, a series of short duration, low duty factor, relatively low energy pulses act to incrementally crystallize the recording medium. The low duty factor, relatively low energy pulses provide an energy increase in the recording film suitable for optimizing crystallization, with each energy pulse having a duration and repetition rate such that the film temperature falls below the crystallization temperature between pulses. An optional, final, high-energy pass may follow the low energy pulses, which operates to saturate the material in the crystalline state to insure complete initialization. Nucleating followed by incrementally crystallizing is useful in controlling thermal and volume change related stresses within the disk structure to minimize cracking and microscopic delamination.

In practice a data storage device is provided with a phase change data storage medium. The data storage medium is a recording medium with a first changeable state, an intermediate state and a second changeable state. The first changeable state may be an uninitalized state and the second changeable state an initialized state. The intermediate state is a continuously varying or discretely varying state between the first changeable state and the second changeable state with formation of the second changeable state being dependant upon a transition from the first changeable state through the intermediate state. The phase change data storage device is initialized by exposing substantially all the recording medium in the first changeable state with a pre-initialization energy for a time sufficient to initiate the intermediate state from the first changeable state without substantially inducing the second changeable state. This time period is about 1 $\mu$sec or less and more preferably 200 nsec or less. A cooling period is provided after the pre-initialization energy. The second energy exposure is delivered to the recording medium after the cooling period. The recording medium is exposed to the second energy for a time sufficient to significantly progress the intermediate state to the second changeable state. The second energy is repeated or continued until initialization is complete.

If the phase change data storage medium is a chalcogenide material, the memory medium is changeable between an amorphous state and a crystalline state. The unitalized device may be at least partially in the amorphous state. In accordance with the method of the present invention, at least a portion of the chalcogenide data storage medium is exposed to a first energy for a time and power sufficient to initiate nucleation of the amorphous state without substantially progressing crystal growth. Following the first energy exposure, the chalcogenide material is allowed to cool below the nucleation temperature of the chalcogenide material. The chalcogenide material is then exposed with a second energy for a time and power sufficient to progress crystal growth. The second exposure is repeated or continued until initialization is complete.

While the invention has been illustrated in detail in the drawings and the foregoing description, the same is to be considered as illustrative and not restrictive in character, it is understood that only the preferred embodiments have been shown and described fully and that all changes and modifications that come within the spirit of the invention are desired to be protected.

What is claimed is:

1. A method for initializing a data storage device comprising the steps of:
    providing a data storage device having a phase change data storage medium and a substrate, the substrate supporting the phase change data storage medium; and
    exposing the phase change data storage medium to a plurality of energy pulses, wherein the plurality of energy pulses includes a first energy pulse, the first energy pulse exposing substantially all of the data storage medium at one time without completely initializing the exposed data storage medium, the first pulse being followed by at least one additional pulse which exposes substantially all of the data storage medium; and
    the first energy pulse has a power sufficient to heat the phase change data storage medium to a temperature sufficient to nucleate the data storage medium without significant crystal growth.

2. The method of claim 1 wherein the first energy pulse provides an energy having a higher energy absorption in the phase change data storage medium than in the substrate.

3. The method of claim 2 wherein the energy absorption in the phase change data storage medium is at least 5 times greater than in the substrate.

4. The method of claim 2 wherein the first energy pulse has at least one discrete wavelength of light selected from the group consisting of red light, green light, or blue light.

5. The method of claim 1 wherein the plurality of energy pulses are provided by at least one laser.

6. The method of claim 1 wherein the plurality of energy pulses are provided by a xenon flash lamp.

7. The method of claim 1 wherein the phase change data storage medium is a chalcogenide memory medium.

8. The method of claim 1 wherein the duration of the first pulse is 200 nano seconds or less.

9. The method of claim 1 wherein the plurality of energy pulses includes at least one energy pulse having a power and duration sufficient to saturate the recording medium.

10. The method of claim 1 wherein the data storage device is an optical disk.

11. The method of claim 1, wherein the first pulse is 1 $\mu$sec or less.

12. A method for initializing a phase change data storage device comprising the steps of:
    providing a data storage device, the data storage device having a recording medium with a first changeable state, an intermediate state and a second changeable state, the first changeable state being an uninitialized state and the second changeable state being an initialized state, the intermediate state being a continuously or discretely varying state between the first changeable state and the second changeable state, the formation of the second changeable state being dependant upon a transition from the first changeable state through the intermediate state;
    exposing at least a portion of the recording medium in the first changeable state with a pre-initialization energy for a time sufficient to initiate the intermediate state from the first changeable state without substantially inducing the second changeable state;
    allowing the recording medium to cool; and
    exposing the recording medium with at least one additional energy exposure for a time sufficient to significantly progress the intermediate state to the second changeable state.

13. The method of claim 12 wherein the method further comprises the step of exposing the recording medium with energy until the second changeable state is a substantially complete state.

14. The method of claim 12 wherein the pre-initialization energy is a pulse of energy, the pulse of energy lasting 1 $\mu$sec or less.

15. The method of claim 12 wherein the additional energy comprises a plurality of energy pulses.

16. The method of claim 15 wherein the plurality of energy pulses includes at least one pulse having a power and a duration sufficient to saturate the recording medium.

17. The method of claim 12 wherein the additional energy is thermal energy.

18. A method for initializing a phase change data storage device comprising the steps of:
    providing a phase change data storage device, the phase change data storage device having a recording medium changeable between an amorphous state and a crystalline state, the recording medium being at least partially in the amorphous state;
    exposing at least a portion of the recording medium with a first energy for a time and power sufficient to initiate nucleation of the amorphous state without substantially progressing crystal growth;

cooling the recording medium below the nucleation temperature of the recording medium; and exposing the recording medium with a second energy for a time and power sufficient to progress crystal growth.

19. The method of claim 18 wherein the step for exposing the recording medium with a second energy is repeated until the crystalline state is formed.

20. The method of claim 18 wherein the second energy comprises a plurality of discrete energy pulses.

21. The method of claim 18 wherein the first energy is generated by a laser.

22. The method of claim 18 wherein the first energy is generated by a xenon flash lamp.

23. The method of claim 18 wherein the recording medium comprises at least one element selected from the group consisting of Te, Se, Sb, Ge, In, or Ag.

24. The method of claim 23 wherein the recording medium comprises Te as a main component.

25. The method of claim 23 wherein the recording memory medium comprises Sb as a main component.

26. The method of claim 18 wherein the time to initiate nucleation is 1 $\mu$sec or less.

27. The method of claim 18 wherein the time to initiate nucleation is 200 nsec or less.

28. The method of claim 18 wherein the power to initiate nucleation is a power/time profile suitable for heating the recording medium to a temperature sufficient to initiate nucleation without significant crystal growth.

29. The method of claim 18 wherein the information storage device is an optical disk.

30. The method of claim 18 wherein the second energy is thermal energy.

31. The method of claim 30 wherein the first energy is a different form of energy than the second energy.

32. The method of claim 18 wherein the step of exposing at least a portion of the recording medium to a first energy is simultaneously exposing substantially all the recording medium to a first energy.

33. The method of claim 18 wherein the first energy is provided by a laser or flash lamp and the second energy is provided by the other of a laser or flash lamp.

* * * * *